US012617714B2

(12) United States Patent
Pei et al.

(10) Patent No.: US 12,617,714 B2
(45) Date of Patent: May 5, 2026

(54) STRENGTHENED GLASS AND GLASS STRENGTHENING METHOD, AND ELECTRONIC DEVICE HOUSING

(71) Applicant: BYD COMPANY LIMITED, Guangdong (CN)

(72) Inventors: Yulei Pei, Shenzhen (CN); Shuang Wu, Shenzhen (CN); Qiying Gai, Shenzhen (CN); Jingna Cui, Shenzhen (CN); Jiaxin Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 84 days.

(21) Appl. No.: 18/398,698

(22) Filed: Dec. 28, 2023

(65) Prior Publication Data

US 2024/0140861 A1 May 2, 2024

Related U.S. Application Data

(63) Continuation of application No. PCT/CN2022/120561, filed on Sep. 22, 2022.

(30) Foreign Application Priority Data

Sep. 29, 2021 (CN) .......................... 202111157824.6

(51) Int. Cl.
    *C03C 21/00* (2006.01)
    *C03C 4/18* (2006.01)
(52) U.S. Cl.
    CPC .............. *C03C 21/002* (2013.01); *C03C 4/18* (2013.01); *C03C 2203/50* (2013.01); *C03C 2204/00* (2013.01)

(58) Field of Classification Search
None
See application file for complete search history.

(56) References Cited

U.S. PATENT DOCUMENTS

2013/0012225 A1   1/2013  Inoue et al.
2013/0122254 A1   5/2013  Liang
            (Continued)

FOREIGN PATENT DOCUMENTS

CN     102584027 A   7/2012
CN     103803811 A   5/2014
            (Continued)

OTHER PUBLICATIONS

International Search Report and Written Opinion for Application No. PCT/CN2022/120561, mailed on Dec. 19, 2022, 10 pages.

*Primary Examiner* — David Sample
(74) *Attorney, Agent, or Firm* — Sheppard Mullin Richter & Hampton LLP

(57) ABSTRACT

The present disclosure provides a strengthened glass and a glass strengthening method, and an electronic device housing. Two opposing sides of the strengthened glass have surface compressive stress layers, and a third stress layer is sandwiched between the two surface compressive stress layers. The third stress layer includes a compressive stress region and multiple tensile stress regions spaced apart within the compressive stress region, the multiple tensile stress regions are extended in a thickness direction of the strengthened glass, and each of the tensile stress regions is surrounded by the compressive stress region. A sum of thicknesses of the surface compressive stress layers and a thickness of the compressive stress region located between two adjacent tensile stress regions is equal to a thickness of the strengthened glass.

20 Claims, 4 Drawing Sheets

(56)                    References Cited

U.S. PATENT DOCUMENTS

| | | | |
|---|---|---|---|
| 2016/0023611 A1* | 1/2016 | Huelke | B60Q 3/82 |
| | | | 224/486 |
| 2016/0167343 A1 | 6/2016 | Gulati et al. | |
| 2020/0017406 A1 | 1/2020 | Wilson et al. | |
| 2020/0301048 A1* | 9/2020 | Goeckeritz | C03C 21/002 |

FOREIGN PATENT DOCUMENTS

| | | | |
|---|---|---|---|
| CN | 106830709 A | 6/2017 | |
| CN | 109748518 A | 5/2019 | |
| CN | 110713351 A | 1/2020 | |
| CN | 110770188 A | 2/2020 | |
| CN | 111099823 A | 5/2020 | |
| CN | 111204991 A | 5/2020 | |
| CN | 115043601 A | 9/2022 | |
| JP | 2014012611 A | 1/2014 | |
| WO | 2014/104050 A1 | 7/2014 | |
| WO | WO-2016149860 A1 * | 9/2016 | C03C 3/093 |

* cited by examiner

STRENGTHENED GLASS AND GLASS STRENGTHENING METHOD, AND ELECTRONIC DEVICE HOUSING

CROSS-REFERENCE TO RELATED APPLICATIONS

This application is a Continuation Application of International Patent Application No. PCT/CN2022/120561, filed on Sep. 22, 2022, which claims priority to Chinese Patent Application No. 202111157824.6, filed on Sep. 29, 2021. The entire content of all of the above-referenced applications is incorporated herein by reference.

FIELD

The present disclosure relates to the field of strengthened glass technologies, and more specifically, to strengthened glass and a glass strengthening method, and an electronic device housing.

BACKGROUND

Glass is widely used as a cover plate in the field of electronic products. With the development of electronic products to be thinner and lighter, the mechanical performance of a glass cover plate is stricter. Chemical strengthening (that is, ion exchange) may be used to improve the mechanical performance of the glass. Large-radius ions in molten salt are used to replace small-radius ions on a surface of the glass, and a compressive stress layer with a specific thickness is formed on the surface of the glass. Although the compressive stress layer can hinder expansion of cracks in the glass, to improve a strength of the strengthened glass, a hindering effect of the compressive stress layer on expansion of microcracks is limited. Consequently, a mechanical strength of the glass is mainly affected by the microcracks on the surface and an interior of the glass. Therefore, it is necessary to provide a strengthening method that can effectively hinder the expansion of the microcracks and improve an intrinsic strength of the glass, to improve the mechanical performance of the strengthened glass.

SUMMARY

Based on the above, the present disclosure provides a glass strengthening method and a strengthened glass. Through a two-step chemical strengthening process, a periodic surrounding compressive stress distribution is formed inside the glass and a uniform and dense surface compressive stress layer is formed on the surface layer, so as to achieve a multi-layer hindering effect on the glass surface and internal micro-crack expansion, reduce or even eliminate the impact of a single crack on the overall strength of the glass, and improve a fracture threshold, a bending strength, an impact resistant strength, and another mechanical performance of the glass.

A first aspect of the present disclosure provides a strengthened glass. The strengthened glass includes a first surface and a second surface that are disposed opposite to each other. The first surface has a first surface compressive stress layer, and the second surface has a second surface compressive stress layer. The strengthened glass further includes a third stress layer sandwiched between the first surface compressive stress layer and the second surface compressive stress layer. The third stress layer includes a compressive stress region and multiple tensile stress regions spaced apart within the compressive stress region. The multiple tensile stress regions are extended in a thickness direction of the strengthened glass, and each of the tensile stress regions is surrounded by the compressive stress region. A sum of a thickness of the compressive stress region, a thickness of the first surface compressive stress layer, and a thickness of the second surface compressive stress layer is equal to a thickness of the strengthened glass.

In some embodiments, the thickness of the strengthened glass is 0.1 mm to 5 mm.

In some embodiments, the thickness of the first surface compressive stress layer is 1% to 10% of the thickness of the strengthened glass; and the thickness of the second surface compressive stress layer is 1% to 10% of the thickness of the strengthened glass.

In some embodiments, a surface compressive stress of the strengthened glass is greater than or equal to 500 MPa.

In some embodiments, in the strengthened glass, a quantity of tensile stress regions is greater than or equal to 3.

In some embodiments, a compressive stress of the compressive stress region is less than the surface compressive stress of the strengthened glass; and the compressive stress of the compressive stress region is greater than or equal to 8 MPa.

In some embodiments, a bending strength of the strengthened glass is greater than or equal to 800 MPa.

In some embodiments, impact resistance energy of the strengthened glass is greater than or equal to 3 J.

There is a surface compressive stress layer with a relatively high stress value on the surface of the strengthened glass, and a compressive stress is distributed throughout the thickness direction of the strengthened glass between the tensile stress regions, which makes a stress depth of the strengthened glass very deep. In addition, there is a surrounding compressive stress distribution of the compressive stress region surrounding the tensile stress region inside the strengthened glass, so that expansion of cracks in the strengthened glass is further hindered, and the mechanical performance is better.

A second aspect of the present disclosure provides a glass strengthening method, including the following steps:

respectively forming multiple shielding layers that are spaced apart on a first surface and a second surface of a glass substrate, wherein the first surface and the second surface are opposite to each other, where the shielding layers on the first surface are in a one-to-one correspondence with the shielding layers on the second surface;

performing first chemical strengthening on the glass substrate with the shielding layer, to form a first compressive stress layer on a surface of the glass substrate that is covered by the shielding layer and on a surface and an interior of the glass substrate that are not covered by the shielding layer, and form multiple tensile stress regions inside the glass substrate covered by the shielding layers, where the tensile stress region is surrounded by the first compressive stress layer, and a thickness of the first compressive stress layer that is not covered by the shielding layer is equal to a thickness of the glass substrate;

removing the shielding layers; and performing second chemical strengthening on the glass substrate after the shielding layers are removed to obtain a strengthened glass.

In some embodiments, a total coverage rate of the multiple shielding layers on the first surface or the second surface is 10% to 70%.

In some embodiments, a quantity of shielding layers on the first surface or the second surface is greater than or equal to 3.

In some embodiments, when the thickness of the glass substrate is 0.5 mm or more, the first chemical strengthening is performed for 300 min or more.

In some embodiments, the first chemical strengthening is performed using a molten salt including a sodium element at a temperature of 350° C. to 440° C.

In some embodiments, the second chemical strengthening is performed using a molten salt including a potassium element at a temperature of 350° C. to 440° C.

In some embodiments, the second chemical strengthening is performed for 10 min to 200 min.

The inventor of the present disclosure found that a depth of stress layer (DOL) of an existing strengthened glass is relatively shallow, so that an effect of hindering expansion of microcracks is limited. The glass strengthening method provided in the embodiments of the present disclosure is simple, convenient and highly controllable. A surface of the strengthened glass obtained by the strengthening method is provided with a surface compressive stress layer, and a compressive stress distribution surrounding the tensile stress region is provided inside the strengthened glass, so that an overall stress depth of the strengthened glass is relatively deep, and the mechanical performance is greatly improved.

A third aspect of the present disclosure provides an electronic device housing. The electronic device housing includes the strengthened glass in the first aspect of the present disclosure, or includes the strengthened glass prepared by the glass method in the second aspect of the present disclosure.

The electronic device housing having the strengthened glass can meet a requirement of thinning and lightening of an electronic device, and has good mechanical performance.

DETAILED DESCRIPTION

It should be noted that the following descriptions are merely exemplary embodiments of the present disclosure, and a person of ordinary skill in the art may make various improvements and modifications without departing from the spirit of embodiments of the present disclosure. All such improvements and refinements shall fall within the protection scope of the embodiments of the present disclosure.

Figure 1A:
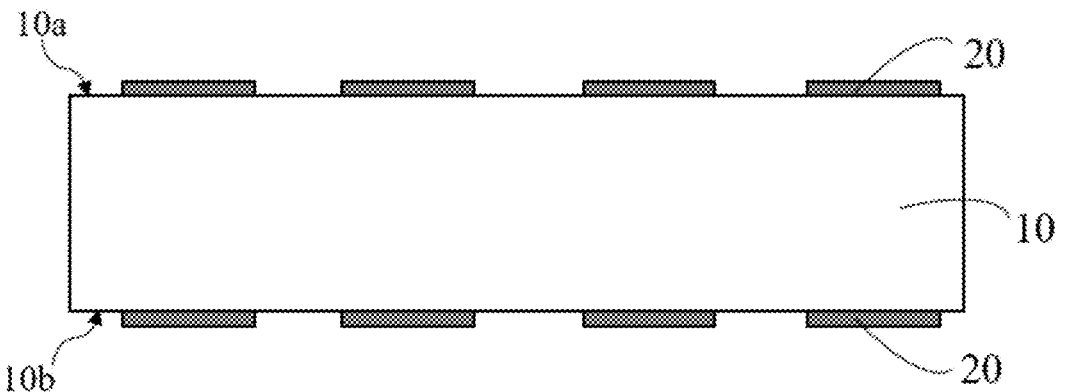
FIG. 1A is a schematic cross-sectional structural diagram of a glass substrate with a shielding layer.
Figure 1B:
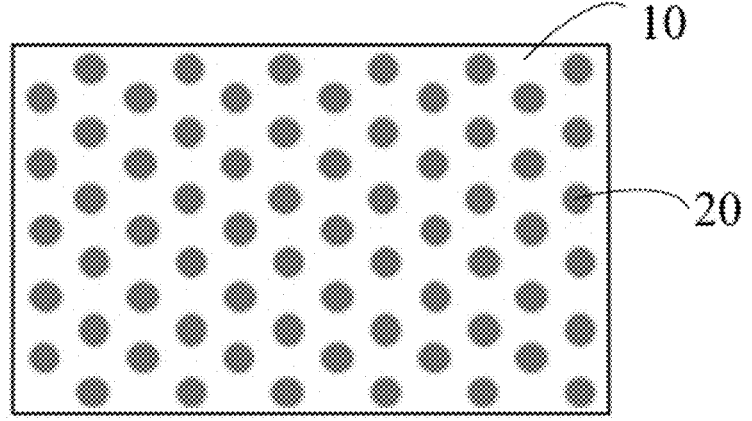
FIG. 1B is a top view of a glass substrate with a shielding layer.

An embodiment of the present disclosure provides a glass strengthening method, including the following steps:

S01. Referring to FIG. 1A and FIG. 1B, multiple shielding layers 20 spaced apart are formed on a first surface 10a and a second surface 10b of a glass substrate 10 that are opposite to each other. The shielding layers on the first surface 10a are in a one-to-one correspondence with the shielding layers on the second surface 10b.

S02. First chemical strengthening is performed on the glass substrate 10 with the shielding layers 20, to form a first compressive stress layer 30 on a surface of the glass substrate 10 that is covered by the shielding layers 20 and on a surface and an interior of the glass substrate 10 that are not covered by the shielding layers 20, and form multiple tensile stress regions 40 inside the glass substrate covered by the shielding layers 20, where the tensile stress region 40 is surrounded by the first compressive stress layer 30, and a thickness of the first compressive stress layer 30 that is not covered by the shielding layer 20 is equal to a thickness of the glass substrate 10 (referring to FIG. 2A).

S03. The shielding layers 20 are removed.

S04. Second chemical strengthening is performed on the glass substrate 10 after the shielding layers 20 are removed to obtain a strengthened glass shown in FIG. 3.

In step S01, the glass substrate 10 includes the first surface 10a and the second surface 10b that are opposite to each other. Multiple shielding layers 20 that are spaced apart are formed on the first surface 10a, and the multiple shielding layers 20 are in direct contact with the first surface 10a. Multiple shielding layers 20 that are spaced apart are also formed on the second surface 10b. For example, the first surface 10a may be an upper surface of the glass substrate 10, and the second surface 10b may be a lower surface of the glass substrate 10. For better distinction, the shielding layer on the first surface 10a may be referred to as a first shielding layer, and the shielding layer on the second surface 10b may be referred to as a second shielding layer. The first shielding layer and the second shielding layer are arranged in one-to-one correspondence. In other words, each second shielding layer on the second surface 10b corresponds to a first shielding layer on the first surface 10a (the two shielding layers overlap with each other in a thickness direction of the glass substrate), or the first shielding layer and the second shielding layer are disposed symmetrically with respect to the glass substrate 10. In this way, the first shielding layer and second shielding layer are in a one-to-one correspondence, which is beneficial to subsequently formation of a symmetrical stress distribution on two opposing sides of the glass substrate.

In an implementation of the present disclosure, the shielding layer 20 may be formed on a surface of the glass substrate through a process such as screen printing, coating (for example, spraying), plating, or exposure and development. The shielding layer 20 is made of a high-temperature resistant material such as a high temperature resistant silicone material, synthetic rubber, or metal oxide. A pattern shape (which specifically refers to a projection shape of the shielding layer on the glass substrate) of the shielding layer 20 includes a regular shape such as a circle, an oval, a triangle, a rectangle, or a polygon, or an irregular shape. The shielding layers 20 are arranged spaced apart on the surface of the glass substrate. For example, the multiple shielding layers 20 may be arranged in an array shown in FIG. 1B on the surface of the glass substrate, or may be arranged in another manner as required. An existence of the shielding layer 20 divides the surface of the glass substrate into a shielded region and an exposed region (which is not covered by the shielding layer 20), and can prevent diffusion of ions in strengthening molten salt to the glass, for example, can prevent ion exchange inside the glass in the shielded region.

In an implementation of the present disclosure, a total coverage rate of the multiple shielding layers 20 on the first surface 10*a* or the second surface 10*b* of the glass substrate may be 10% to 70%. An area coverage rate of the shielding layer is within this range, which is helpful to implement a chemical strengthening effect described in step S02 below. For example, the total coverage rate may be 15%, 20%, 25%, 30%, 40%, 50%, 60%, or 65%. In some implementations, the coverage rate is 20% to 50%.

In the implementation of the present disclosure, a quantity of shielding layers 20 on the first surface 10*a* or the second surface 10*b* is greater than or equal to 3. This is beneficial to forming a periodic surrounding compressive stress distribution in which multiple tensile stress regions 40 are wrapped at intervals inside the first compressive stress layer 30.

In the present disclosure, the glass substrate 10 is a glass including a Li element, so that two-step chemical strengthening can be performed. For example, the glass substrate may be lithium aluminum silicate glass. In some embodiments, a thickness of the glass substrate 11 may be 0.1 mm to 5 mm. This facilitates obtaining the first compressive stress layer 30 with a thickness equal to the thickness of the glass substrate by the following first chemical strengthening, and the strengthened glass does not have poor mechanical performance even with a thin thickness.

In step S02 of the present disclosure, the first chemical strengthening is generally to perform ion exchange with a molten salt including a Na element, which is mainly $Na^+ \rightarrow Li^+$ exchange. The second chemical strengthening is generally to perform ion exchange with a molten salt including a K element, which is mainly $K^+ \rightarrow Na^+$ exchange. In step S02, the molten salt used for the first chemical strengthening may include the following components by mass percentage: 60% to 100% sodium salt and 0 to 40% potassium salt. In other words, the molten salt used for the first chemical strengthening may be only sodium salt, or a mixture of sodium salt and potassium salt. For example, the sodium salt may be at least one of a nitrate, a sulfate, a chloride, or the like of the Na element, and generally, the nitrate is common. The potassium salt is similar to the sodium salt. In an embodiment of the present disclosure, the molten salt used for the first chemical strengthening is the sodium salt. In some embodiments, only the sodium salt is used for the first chemical strengthening, and a penetration distribution of $Na^+$ in the glass that is not covered by the shielding layer can be better implemented by using $Na^+$ with a relatively small ionic radius.

Relatively long first chemical strengthening is performed by using the spaced shielding layers. The penetration distribution of $Na^+$ in the glass that is not covered by the shielding layer 20 can be implemented (that is, $Na^+$ is exchanged in an entire thickness of the glass substrate that is not covered by the shielding layer (a Z direction shown in FIG. 2A, that is, a direction perpendicular to a glass surface provided with the shielding layer)). In addition, $Na^+$ in the molten salt may be further exchanged into the surface of the glass substrate covered by the shielding layer 20 (that is, $Na^+$ diffuses in a direction parallel to the glass surface provided with the shielding layer (an X direction shown in FIG. 2*a*)). The two parts jointly form the first compressive stress layer 30. In addition, due to the existence of the shielding layer 20, it is difficult to exchange $Na^+$ in the molten salt into the inside of the glass covered by the shielding layer 20, which becomes the tensile stress region 40.

In some implementations of the present disclosure, when a thickness of the glass substrate is 0.5 mm or more, the first chemical strengthening may be controlled to be 300 min or more, so that a thickness of a part of the first compressive stress layer 30 is equal to the thickness of the glass substrate 10. In some implementations, the strengthening is performed for 300 min to 600 min, for example, 360 min, 420 min, 480 min, or 540 min.

In the present disclosure, the first compressive stress layer 30 is a portion of the glass substrate in which first ion exchange occurs and may be considered as a sum of portions of the glass substrate other than the multiple tensile stress regions 40. The first compressive stress layer 30 may be further understood to include two parts. As shown in FIG. 2B, one part refers to a compressive stress layer part located on the surface of the glass substrate 10 (which is represented by a reference numeral 30*a* in FIG. 2B, and includes the surface of the glass substrate covered and uncovered by the shielding layer 20), and the other part refers to a compressive stress layer part located inside the glass substrate and surrounding the tensile stress region 40 (which is represented by a reference numeral 30*b* in FIG. 2B).

Figure 2A:
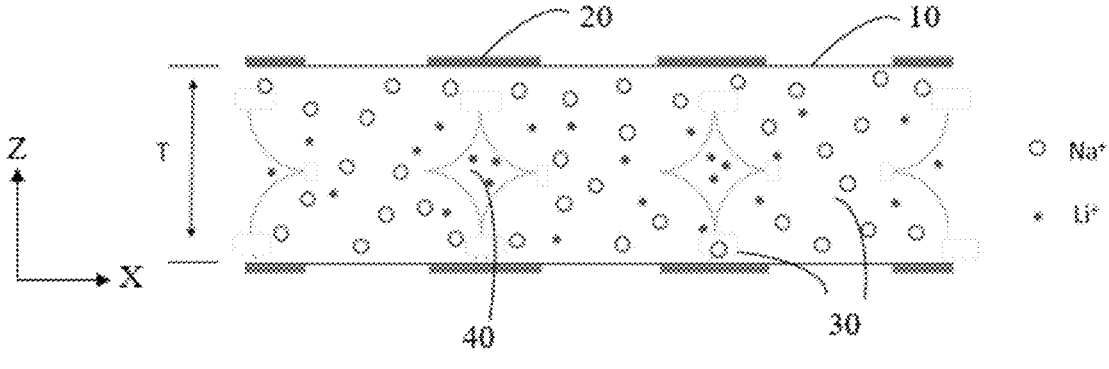
FIG. 2A is a schematic diagram of ion exchange of a glass substrate after first chemical strengthening.
Figure 2B:
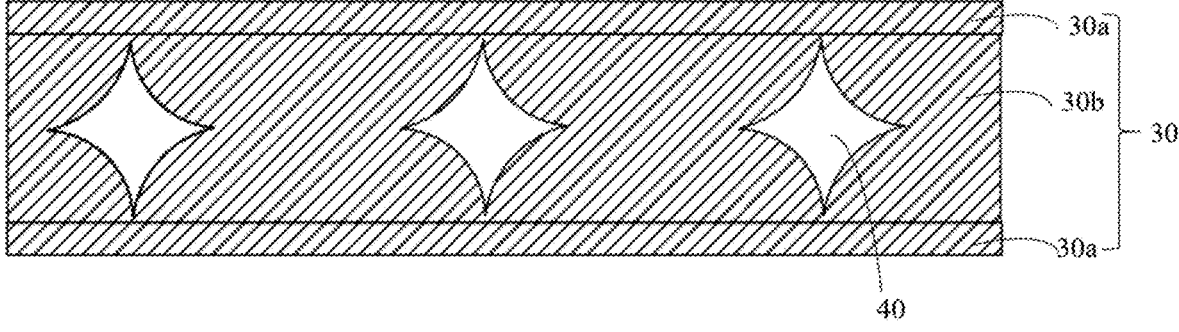
FIG. 2B is a schematic structural diagram of a glass substrate after first chemical strengthening.

As shown in FIG. 2A, after the first chemical strengthening, a periodic distribution of compressive stress-tensile stress is formed inside the glass. The tensile stress region 40 is spaced apart in the first compressive stress layer 30, and the tensile stress region 40 is surrounded by the first compressive stress layer 30, which helps to sufficiently hinder the expansion of the microcracks in the tensile stress region inside the glass, and compared with a glass substrate without chemical strengthening, the first compressive stress layer 30 formed by ion exchange changes a surrounding environment of the cracks in the region, passivates the cracks, and suppresses the expansion of the cracks in the region. In addition, the periodic distribution of the compressive/tension stress can also increase a strength of the glass, thereby reducing the dispersion (the dispersion refers to non-uniform distribution of the glass strength) of the glass and improving the mechanical performance of the glass.

The first compressive stress layer 30 may be considered as the sum of the portions of the glass substrate 10 other than the tensile stress region 40. It may be understood that the first compressive stress layer 30 is irregular in shape, and a depth (or thickness) of the first compressive stress layer is not uniform, but the thickness of the first compressive stress layer 30 that is not covered by the shielding layer 20 is equal to the thickness of the glass substrate 10. This also indicates that after the first chemical strengthening, a relatively deep first compressive stress layer is formed, which helps to improve the mechanical performance of the glass substrate.

In some embodiments, the first chemical strengthening is performed at 350° C. to 440° C. In some embodiments, the strengthening temperature may be 390° C., 400° C., 420° C., 430° C., or the like.

In some implementations of the present disclosure, the glass substrate 10 with the shielding layer 20 may be preheated before the first chemical strengthening, and then the preheated glass substrate may be placed in the molten salt including the Na element for ion exchange. Preheating can prevent a low-temperature glass substrate from cracking due to sudden temperature change with the high temperature molten salt, and reduce surface density of the glass substrate, which helps to increase a depth and a surface compressive stress value of the compressive stress layer obtained by chemical strengthening. The glass substrate may be preheated to a temperature of 320° C. to 400° C. For example, the glass substrate is heated to 350° C., 360° C., 370° C., 380° C., 390° C., or the like.

In step S03, the shielding layer 20 may be removed by at least one of a mechanical polishing technique and soaking in a chemical solution. The used chemical solution is generally an alkaline solution, for example, a NaOH solution or a KOH solution. In addition, the alkaline solution may be heated (for example, 50° C. to 70° C.), to improve a removing speed of the shielding layer.

Figure 3:
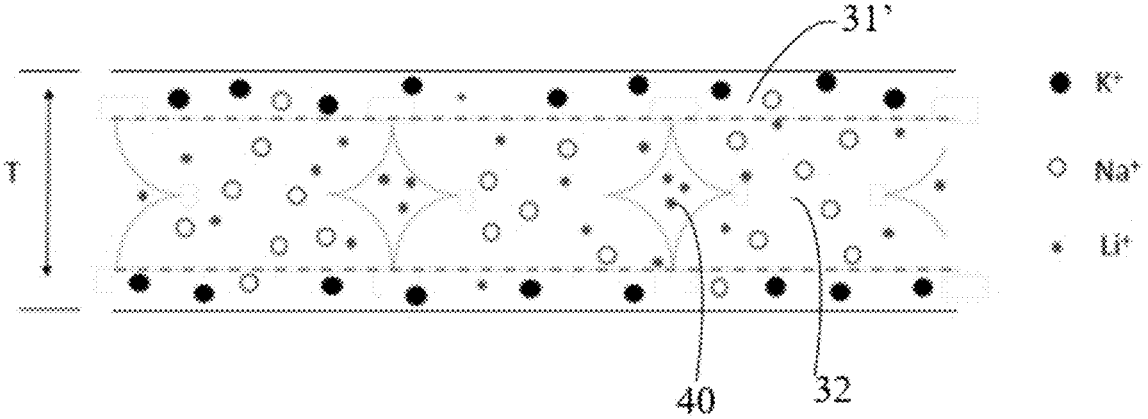
FIG. 3 is a schematic diagram of ion exchange of a glass substrate after second chemical strengthening.

In step S04, the second chemical strengthening is performed on the glass substrate with the shielding layer being removed, so that ions (for example, K$^+$) with a relatively large ion radius may diffuse on the glass surface (as shown in FIG. 3), thereby further increasing the compressive stress on the glass surface (that is, forming surface compressive stress layers 31' and 31" with relatively high compressive stresses). There is also compressive stress distribution surrounding the tensile stress region 40 inside the glass, so that the mechanical performance of the obtained strengthened glass is better.

It can be learned from the comparison between FIG. 3 and FIG. 2A that a sum of regions indicated by reference numerals 31', 31", and 32 is equal to the first compressive stress layer 30 in FIG. 2A. It may be understood that, the thickness of the surface compressive stress layer 31' or 31" may not be equal to the thickness of the first compressive stress layer 30 that is formed on the surface of the glass substrate 10 covered by the shielding layer 20 in S02. The thickness of the surface compressive stress layer may alternatively not be equal to the thickness of the region 30a shown in FIG. 2B.

The molten salt used for the second chemical strengthening may include the following components by mass percentage: 0 to 40% sodium salt and 60 to 100% potassium salt. In some embodiments, the molten salt used for the second chemical strengthening may be only potassium salt, or a mixture of sodium salt and potassium salt. In an embodiment of the present disclosure, the molten salt used for the second chemical strengthening is the potassium salt.

In an implementation of the present disclosure, the second chemical strengthening may be performed at 350° C. to 440° C. for 10 min to 200 min. In some embodiments, the second chemical strengthening may be performed at 390° C., 400° C., 420° C., 430° C., or the like. The second chemical strengthening may be performed for 30 min, 60 min, 90 min, 120 min, 150 min, 180 min, or the like. In the present disclosure, the time for performing the second chemical strengthening is relatively short, and a surface compressive stress layer with a relatively high compressive stress and even distribution can be formed in a relatively short time, and a time course of the entire strengthening process can be shortened in combination with the first chemical strengthening.

Similarly, the glass substrate may also be preheated before the second chemical strengthening to improve a strengthening effect. The glass substrate may be preheated to a temperature of 320° C. to 400° C., for example, heated to 360° C., 370° C., 380° C., 390° C., or the like.

The glass strengthening method provided in the embodiments of the present disclosure is simple, convenient, and highly controllable. A surface of the strengthened glass obtained by the strengthening method is provided with a surface compressive stress layer, and a compressive stress distribution surrounding the tensile stress region is provided inside the strengthened glass, so that an overall stress depth of the strengthened glass is relatively deep, and the mechanical performance is greatly improved.

Figure 4:
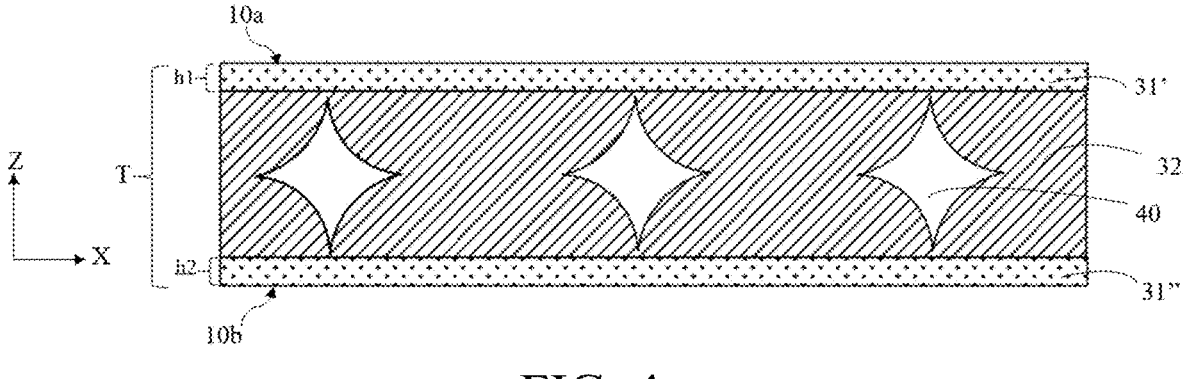
FIG. 4 is a schematic structural diagram of a strengthened glass according to an embodiment of the present disclosure.

An embodiment of the present disclosure further provides a strengthened glass. As shown in FIG. 4, the strengthened glass includes a first surface 10a and a second surface 10b that are opposite to each other. The first surface 10a has a first surface compressive stress layer 31', the second surface 10b has a second surface compressive stress layer 31", and a third stress layer is further sandwiched between the two surface compressive stress layers. The third stress layer includes a compressive stress region 32 and multiple tensile stress regions 40 spaced apart within the compressive stress region 32, the multiple tensile stress regions 40 are extended in a thickness direction of the strengthened glass, and each of the tensile stress regions 40 is surrounded by the compressive stress region 32. A sum of a thickness of the compressive stress region 32 located between two adjacent tensile stress regions 40, a thickness of the first surface compressive stress layer 31', and a thickness of the second surface compressive stress layer 31" is equal to a thickness T of the strengthened glass. The strengthened glass may be obtained by using the foregoing strengthening method in the present disclosure.

In some embodiments, the first surface compressive stress layer 31' extends from the first surface 10a to the inside by a first depth h1, and the second surface compressive stress layer 31" extends from the second surface 10b to the inside by a second depth h2. h1 may be equal to or may be different from h2. Although FIG. 4 shows that only the first surface 10a and the second surface 10b of the strengthened glass have surface compressive stress layers, glass-based strengthening treatment is generally performed by immersing the substrate in molten salt at a specific temperature. It may be understood that another surface of the strengthened glass further has a surface compressive stress layer with a specific depth.

It can be learned from FIG. 4 that the multiple tensile stress regions 40 are spaced apart within the compressive stress region 32, to form a surrounding compressive stress distribution. The multiple tensile stress regions 40 are spaced apart in a direction parallel to the first surface 10a or the second surface 10b (that is, in the thickness direction perpendicular to the strengthened glass). It may be understood that, the compressive stress region 32 is of an irregular shape and a thickness of the compressive stress region 32 may not be uniform. Based on the fact that the multiple tensile stress regions 40 are spaced apart within the compressive stress region 32, the compressive stress region 32 may be considered as a layer in which a partial region is hollow. The hollow place is filled with tensile stress region 40. The thickness of the compressive stress region 32 located between two adjacent tensile stress regions 40 is maximum, and a sum of the thickness of the compressive stress region and the thicknesses of the two surface compressive stress layers on the first surface 10a and the second surface 10b is equal to the thickness T of the strengthened glass. A sum of a thickness of the third stress layer (that is, the maximum thickness of the compressive stress region 32) and thicknesses of the two surface compressive stress layers 31' and 31" is equal to the thickness T of the strengthened glass. In addition, because the surface compressive stress layer 31' is located on the surface of the strengthened glass, and the compressive stress region 32 is located inside the strengthened glass, it may be understood that a compressive stress of the surface compressive stress layer 31' is greater than a compressive stress of the compressive stress region 32. Generally, the compressive stress of the compressive stress region 32 inside the glass is greater than or equal to 8 MPa, for example, 8 MPa to 100 MPa.

Therefore, the surrounding compressive stress distribution inside the strengthened glass and the surface compressive stress layer having a relatively high stress value on the surface of the strengthened glass cause the cracks in the strengthened glass to be passivated, and the crack expansion is sufficiently hindered.

In an implementation of the present disclosure, the thickness T of the strengthened glass may be 0.1 mm to 5 mm. Therefore, when the strengthened glass is used as a housing of an electronic device (for example, a display screen cover plate, a camera protection cover plate, and a rear cover), the thickness of the strengthened glass is appropriate and can meet a requirement of lightening and thinning of the electronic device, and the mechanical performance of the strengthened is good. In some embodiments, the thickness T may be 0.2 mm, 0.4 mm, 0.5 mm, 0.8 mm, 1 mm, 1.2 mm, 2 mm, 3 mm, 4 mm, or the like. In some implementations, the thickness T may be 0.1 mm to 1.2 mm. In this case, the electronic device using the strengthened glass is lighter and thinner.

In an implementation of the present disclosure, the thickness of the first surface compressive stress layer 31' or the second surface compressive stress layer 31" is 1% to 10% of the thickness T of the strengthened glass. In this case, the compressive stress of the surface compressive stress layer of the strengthened glass is relatively high, and the compressive stress is relatively uniform. The thickness h1 of the first surface compressive stress layer 31' or the thickness h2 of the second surface compressive stress layer 31" is generally 1 μm to 50 μm. In some implementations, the thickness h1 or h2 is 3 μm to 50 μm. For example, the thickness h1 or h2 is 5 μm, 10 μm, 20 μm, 30 μm, 40 μm, or the like. In the present disclosure, the surface compressive stress of the strengthened glass (that is, the compressive stress of the surface compressive stress layer 31' or 31") is greater than or equal to 500 MPa.

In an implementation of the present disclosure, in the strengthened glass, a quantity of tensile stress regions 40 is greater than or equal to 3. An appropriate quantity of tensile stress regions is beneficial to forming a periodic surrounding compressive stress distribution inside the strengthened glass. It may be understood that the quantity of tensile stress regions 40 corresponds to a quantity of shielding layers on the first surface 10a or the second surface 10b.

In an implementations of the present disclosure, a bending strength of the strengthened glass is greater than or equal to 800 MPa. The bending strength refers to a maximum stress that can be withstood by an object when the object breaks under a bending load or reaches a specified bending moment. A higher bending strength indicates that the strengthened glass has better toughness and is less likely to break. In some implementations, the bending strength of the strengthened glass is 950 MPa to 1500 MPa. Further, the bending strength may be 950 MPa to 1200 MPa.

In an implementation of the present disclosure, impact resistance energy of the strengthened glass is greater than or equal to 3 J. A relatively large impact strength indicates that the strengthened glass has strong impact resistance, is not easy to break, and has good toughness. In some implementations, the impact resistance energy of the strengthened glass is greater than or equal to 3.5 J. In some embodiments, the impact resistance energy is 3.5 J to 6 J.

An embodiment of the present disclosure further provides an electronic device housing. The electronic device housing includes the foregoing strengthened glass in the present disclosure, or includes the strengthened glass prepared by the foregoing glass strengthening method in the present disclosure.

An electronic device using the electronic device housing may be various consumer electronic products, for example, a mobile phone, a tablet computer, a notebook computer, a wearable device (for example, a smartwatch or a smart band), a virtual reality (VR) terminal device, and an augmented reality (AR) terminal device, an e-reader, a television, a camcorder, and a projector.

For example, the electronic device is a portable electronic device such as a mobile phone, a tablet computer, or a wearable product. In some embodiments, the electronic device housing may be a display cover plate assembled on a front side of the electronic device, the display cover plate may cover on a display module, or may be a rear cover assembled on a rear side of the electronic device. In some implementations, when the electronic device is an electronic device having a camera function (for example, a mobile phone or a digital camera), the electronic device housing may also be a camera protection cover plate.

The strengthened glass is used as the housing of the electronic device, which can meet a requirement of lightening and thinning of the electronic device and has good mechanical performance.

The present disclosure is further described in detail below through example embodiments.

Embodiment 1

A glass strengthening method includes the following steps.

(1) A lithium aluminum silicate glass with a thickness of 0.6 mm is selected, and multiple high-temperature resistant shielding layers (with a thickness of 3 μm) spaced apart are printed on two opposing surfaces (for example, an upper surface and a lower surface) of the glass by using a screen printing process, to obtain a glass of which a surface is partially covered, where positions of the shielding layers on the upper surface and the lower surface of the glass are in a one-to-one correspondence, the shielding layer is a circle with a diameter of 1 mm and a center distance of 2 mm, a total coverage rate of the multiple shielding layers on each of the upper surface and the lower surface of the glass is 23%, and a quantity of shielding layers on each of the upper surface and the lower surface of the glass substrate is 3080.

(2) The glass of which the surface is partially covered is preheated at 350° C. and then subject to first chemical strengthening at 400° C. in NaNO₃ molten salt for 400 min to form an first compressive stress layer on a surface of the glass covered by the shielding layer and on a surface and an interior of the glass that are not covered by the shielding layer, and form multiple tensile stress regions inside the glass substrate covered by the shielding layer, where the tensile stress region is surrounded by the first compressive stress layer, and a thickness of the first compressive stress layer that is not covered by the shielding layer is 0.6 mm.

Then, a strengthened glass is taken out, cleaned, and dried.

(3) The glass that is strengthened for the first time is soaked in a NaOH solution at 70° C. for 8 min to remove the shielding layer on the glass surface.

(4) The glass after the shielding layer is removed is preheated at 380° C., and then is subject to second chemical strengthening at 400° C. in KNO₃ molten salt for 130 min, to obtain a strengthened glass, and the strengthened glass is cleaned and dried.

FIG. 4 is a schematic structural diagram of a strengthened glass obtained in Embodiment 1. The upper surface and the lower surface of the strengthened glass each have a surface compressive stress layer with a thickness of 18 and a surface compressive stress of the strengthened glass is 830 MPa.

Embodiment 2

A glass strengthening method includes the following steps.

(1) A lithium aluminum silicate glass with a thickness of 0.6 mm is selected, and multiple high-temperature resistant shielding layers that are spaced apart are formed at corresponding positions of an upper surface and a lower surface of the glass by a screen printing process, to obtain a glass of which a surface is partially covered, where the shielding layer is a circle with a diameter of 1 mm and a center distance of 1.5 mm, a total coverage rate of the multiple shielding layers on each of the upper surface and the lower surface of the glass is 40%, and a quantity of shielding layers on each of the upper surface and the lower surface of the glass is 5350.

(2) The glass of which the surface is partially covered is preheated at 380° C., and then is subject to first chemical strengthening at 420° C. in NaNO₃ molten salt for 350 min, to form a first compressive stress layer and multiple tensile stress regions that are similar to Embodiment 1. After being cooled, the strengthened glass is taken out, cleaned, and dried.

(3) The shielding layer on the glass surface that is strengthened for the first time is removed by polishing.

(4) The glass after the shielding layer is removed is preheated at 380° C., and then is subject to second chemical strengthening at 420° C. in KNO₃ molten salt for 80 min, to obtain a strengthened glass, and the strengthened glass is cleaned and dried.

FIG. 4 is a schematic structural diagram of a strengthened glass obtained in Embodiment 2. The upper surface and the lower surface of the strengthened glass each have a surface compressive stress layer with a thickness of 15 and a surface compressive stress of the strengthened glass is 850 MPa.

Embodiment 3

A glass strengthening method includes the following steps.

(1) A lithium aluminum silicate glass with a thickness of 0.6 mm is selected, and multiple high-temperature resistant shielding layers that are spaced apart are formed at corresponding positions of the upper surface and the lower surface of the glass by a screen printing process, to obtain a glass of which a surface is partially covered, where the shielding layer is a circle with a diameter of 2 mm and a center distance of 2.4 mm, a total coverage rate of the multiple shielding layers on each of the upper surface and the lower surface of the glass is 63%, and a quantity of shielding layers on each of the upper surface and the lower surface of the glass substrate is 2100.

(2) The glass of which the surface is partially covered is preheated at 350° C., and then is subject to first chemical strengthening at 380° C. in NaNO₃ molten salt for 550 min, to form a first compressive stress layer and multiple tensile stress regions that are similar to those in Embodiment 1. After being cooled, the strengthened glass is taken out, cleaned, and dried.

(3) The glass that is strengthened for the first time is soaked in a NaOH solution at 70° C. for 8 min to remove the shielding layer on the glass surface.

(4) The glass after the shielding layer is removed is preheated at 380° C., and then is subject to second chemical strengthening at 420° C. in KNO₃ molten salt for 50 min, to obtain a strengthened glass, and the strengthened glass is cleaned and dried.

FIG. 4 is a schematic structural diagram of a strengthened glass obtained in Embodiment 3. The upper surface and the lower surface of the strengthened glass each have a surface compressive stress layer with a thickness of 12 and a surface compressive stress of the strengthened glass is 900 MPa.

Embodiment 4

A difference between a glass strengthening method and that in Embodiment 3 lies in that:

The thickness of the lithium aluminum silicate glass is 0.5 mm, the shielding layer is a regular hexagon with a side length of 2 mm, and a spacing is 1.4 mm. The total coverage rate of the multiple shielding layers on the glass surface is 50%.

FIG. 4 is a schematic structural diagram of a strengthened glass obtained in Embodiment 4. The upper surface and the lower surface of the strengthened glass each have a surface compressive stress layer with a thickness of 11 and a surface compressive stress of the strengthened glass is 880 MPa.

Embodiment 5

A difference between a glass strengthening method and that in Embodiment 3 lies in that: the first chemical strengthening adopts mixed molten salt including 60 wt % potassium nitrate and 40 wt % sodium nitrate; and the second chemical strengthening adopts mixed molten salt including 95 wt % potassium nitrate and 5 wt % sodium nitrate.

FIG. 4 is a schematic structural diagram of a strengthened glass obtained in Embodiment 5. The upper surface and the lower surface of the strengthened glass each have a surface compressive stress layer with a thickness of 30 and a surface compressive stress of the strengthened glass is 650 MPa.

To highlight the beneficial effects of the embodiments of the present disclosure, the following provides comparative examples:

Comparative Example 1

A difference between a glass strengthening method and that in Embodiment 3 lies in that: the shielding layers that are spaced apart are not formed on the glass surface, and the entire glass is subject to first chemical strengthening in mixed molten salt including 60 wt % potassium nitrate and 40 wt % sodium nitrate, where the strengthening is performed at 380° C. for 120 min; and then the glass is subject to second chemical strengthening in mixed molten salt including 95 wt % potassium nitrate and 5 wt % sodium nitrate, where the strengthening is performed at 380° C. for 45 min.

Comparative Example 2

A difference between a glass strengthening method and that in Embodiment 3 lies in that: the shielding layers that are spaced apart are not formed on the glass surface. According to the method described in Embodiment 3, the first chemical strengthening and the second chemical strengthening are sequentially performed on the glass.

Figure 5:
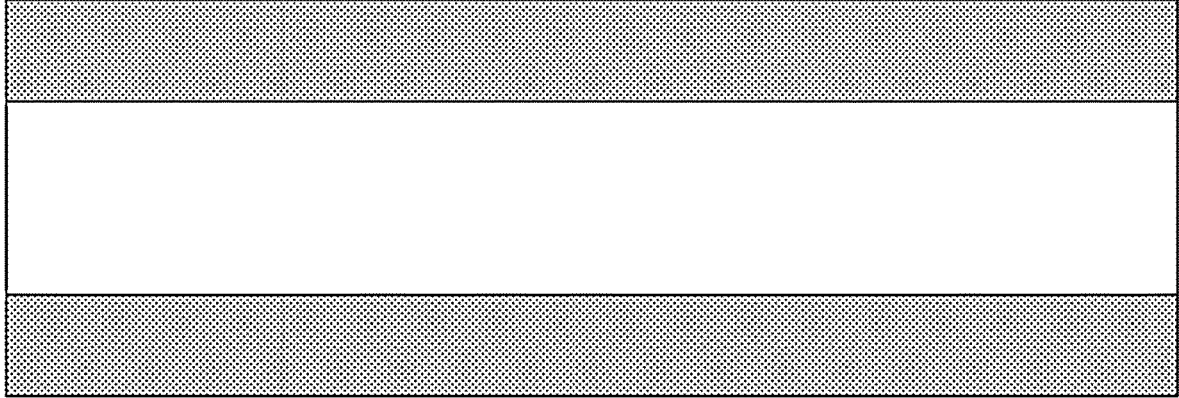
FIG. 5 is a schematic structural diagram of a strengthened glass prepared in Comparative Example 1.

Comparative Example 1 is a glass strengthening process commonly used in this field. The shielding layers that are spaced apart are formed on the glass surface before strengthening in neither Comparative Example 1 nor Comparative Example 2, and after the two-step chemical strengthening, a schematic structural diagram of an obtained strengthened glass is shown in FIG. 5. A surface compressive stress layer with a relatively shallow thickness is formed on only a surface of the strengthened glass. There is no compressive stress distribution inside the strengthened glass, and naturally there is no surrounding stress distribution emphasized in the present disclosure. Therefore, the mechanical performance of the strengthened glass in Embodiment 3 of the present disclosure are better than that in Comparative Example 1 and Comparative Example 2.

To strongly support the beneficial effects of the embodiments of the present disclosure, a bending strength test and an impact resistance test are performed on the strengthened glass in the embodiments and the comparative examples. Results are shown in Table 1 below.

TABLE 1

|  | Bending strength (MPa) | Impact resistance energy (J) |
|---|---|---|
| Embodiment 1 | 1030 | 3.8 |
| Embodiment 2 | 980 | 4 |
| Embodiment 3 | 1180 | 3.6 |
| Embodiment 4 | 1250 | 3.5 |
| Embodiment 5 | 960 | 3.5 |
| Comparative Example 1 | 745 | 1.8 |
| Comparative Example 2 | 650 | 1.5 |

It can be learned from the Table 1 that the strengthened glass provided in the embodiments of the present disclosure is obviously superior to the strengthened glass in the comparative examples in terms of the bending strength, the impact resistant strength, and the like, which indicates that the mechanical performance of the strengthened glass provided in the present disclosure or the strengthened glass obtained by using the strengthening method provided in the present disclosure is significantly improved.

The foregoing embodiments only describe several implementations of the present disclosure, which are described specifically and in detail, but cannot be construed as a limitation to the patent scope of the present disclosure. It should be noted that a person of ordinary skill in the art may make various changes and improvements without departing from the ideas of the present disclosure, which shall all fall within the protection scope of the present disclosure.

What is claimed is:

1. A strengthened glass, comprising:
a first surface and a second surface opposite to each other, the first surface having a first surface compressive stress layer, and the second surface having a second surface compressive stress layer; and
a third stress layer sandwiched between the first surface compressive stress layer and the second surface compressive stress layer,
wherein the third stress layer comprises a compressive stress region and a plurality of tensile stress regions spaced apart within the compressive stress region, the plurality of tensile stress regions are extended in a thickness direction of the strengthened glass, and each of the tensile stress regions is surrounded by the compressive stress region; and
a sum of a thickness of the compressive stress region, a thickness of the first surface compressive stress layer, and a thickness of the second surface compressive stress layer is equal to a thickness of the strengthened glass.

2. The strengthened glass according to claim 1, wherein the thickness of the strengthened glass is 0.1 mm to 5 mm.

3. The strengthened glass according to claim 1, wherein
the thickness of the first surface compressive stress layer is 1% to 10% of the thickness of the strengthened glass; and
the thickness of the second surface compressive stress layer is 1% to 10% of the thickness of the strengthened glass.

4. The strengthened glass according to claim 1, wherein a surface compressive stress of the strengthened glass is greater than or equal to 500 MPa.

5. The strengthened glass according to claim 1, wherein a quantity of the tensile stress regions in the strengthened glass is greater than or equal to 3.

6. The strengthened glass according to claim 1, wherein
a compressive stress of the compressive stress region is less than a surface compressive stress of the strengthened glass; and
the compressive stress of the compressive stress region is greater than or equal to 8 MPa.

7. The strengthened glass according to claim 1, wherein a bending strength of the strengthened glass is greater than or equal to 800 MPa.

8. The strengthened glass according to claim 1, wherein impact resistance energy of the strengthened glass is greater than or equal to 3 J.

9. A method, comprising:
forming a plurality of shielding layers that are spaced apart on a first surface and a second surface of a glass substrate, wherein the first surface and the second surface are opposite to each other, wherein the shielding layers on the first surface are in a one-to-one correspondence with the shielding layers on the second surface;
performing first chemical strengthening on the glass substrate with the shielding layers, to form a first compressive stress layer on a surface of the glass substrate that is covered by the shielding layers and on a surface and an interior of the glass substrate that are not covered by the shielding layers, and form a plurality of tensile stress regions inside the glass substrate covered by the shielding layers, wherein each of the tensile stress regions is surrounded by the first compressive stress layer, and a thickness of the first compressive stress layer that is not covered by the shielding layer is equal to a thickness of the glass substrate;
removing the shielding layers; and
performing second chemical strengthening on the glass substrate after the shielding layers are removed to obtain a strengthened glass.

10. The method according to claim 9, wherein a total coverage rate of the plurality of shielding layers on the first surface or the second surface is 10% to 70%.

11. The method according to claim 9, wherein a quantity of shielding layers on the first surface or the second surface is greater than or equal to 3.

12. The method according to claim 9, wherein when the thickness of the glass substrate is 0.5 mm or more, the first chemical strengthening is performed for 300 min or more.

13. The method according to claim 9, wherein the first chemical strengthening is performed using a molten salt comprising a sodium element at a temperature of 350° C. to 440° C.

14. The method according to claim 9, wherein the second chemical strengthening is performed using a molten salt comprising a potassium element at a temperature of 350° C. to 440° C.

15. The method according to claim 9, wherein the second chemical strengthening is performed for 10 min to 200 min.

16. An electronic device housing comprising a strengthened glass, wherein the strengthened glass comprises:

a first surface and a second surface opposite to each other, the first surface having a first surface compressive stress layer, and the second surface having a second surface compressive stress layer; and a third stress layer sandwiched between the first surface compressive stress layer and the second surface compressive stress layer, wherein the third stress layer comprises a compressive stress region and a plurality of tensile stress regions spaced apart within the compressive stress region, the plurality of tensile stress regions are extended in a thickness direction of the strengthened glass, and each of the tensile stress regions is surrounded by the compressive stress region; and a sum of a thickness of the compressive stress region, a thickness of the first surface compressive stress layer, and a thickness of the second surface compressive stress layer is equal to a thickness of the strengthened glass.

17. The electronic device housing according to claim 16, wherein the thickness of the strengthened glass is 0.1 mm to 5 mm.

18. The electronic device housing according to claim 16, wherein:

the thickness of the first surface compressive stress layer is 1% to 10% of the thickness of the strengthened glass; and the thickness of the second surface compressive stress layer is 1% to 10% of the thickness of the strengthened glass.

19. The electronic device housing according to claim 16, wherein a surface compressive stress of the strengthened glass is greater than or equal to 500 MPa.

20. The electronic device housing according to claim 16, wherein a quantity of the tensile stress regions in the strengthened glass is greater than or equal to 3.

* * * * *